March 24, 1953  G. E. LAMBERT, JR  2,632,674
VEHICLE WHEEL MOUNTING
Filed March 15, 1950  2 SHEETS—SHEET 1

George Edward Lambert, Jr.
INVENTOR.

BY *Clarence A. O'Brien*
*and Harvey B. Jacobson*
Attorneys

March 24, 1953     G. E. LAMBERT, JR     2,632,674
VEHICLE WHEEL MOUNTING

Filed March 15, 1950     2 SHEETS—SHEET 2

George Edward Lambert, Jr.
INVENTOR.

BY *(signatures)*
Attorneys

Patented Mar. 24, 1953

2,632,674

UNITED STATES PATENT OFFICE 2,632,674

VEHICLE WHEEL MOUNTING

George Edward Lambert, Jr., Lanikai, Oahu, Territory of Hawaii

Application March 15, 1950, Serial No. 149,823

1 Claim. (Cl. 301—9)

This invention relates to new and useful improvements and structural refinements in the mounting of vehicle wheels, the principal object of the invention being to facilitate convenient and expeditious removal and installation of a wheel whenever an occasion to do so presents itself, such as for example, when installing a "spare" in the event of a flat tire.

Some of the advantages of the invention reside in its simplicity of construction, in its very expeditious operation, and in its adaptability for use on vehicles of different types.

With the above more important objects and features in view, and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
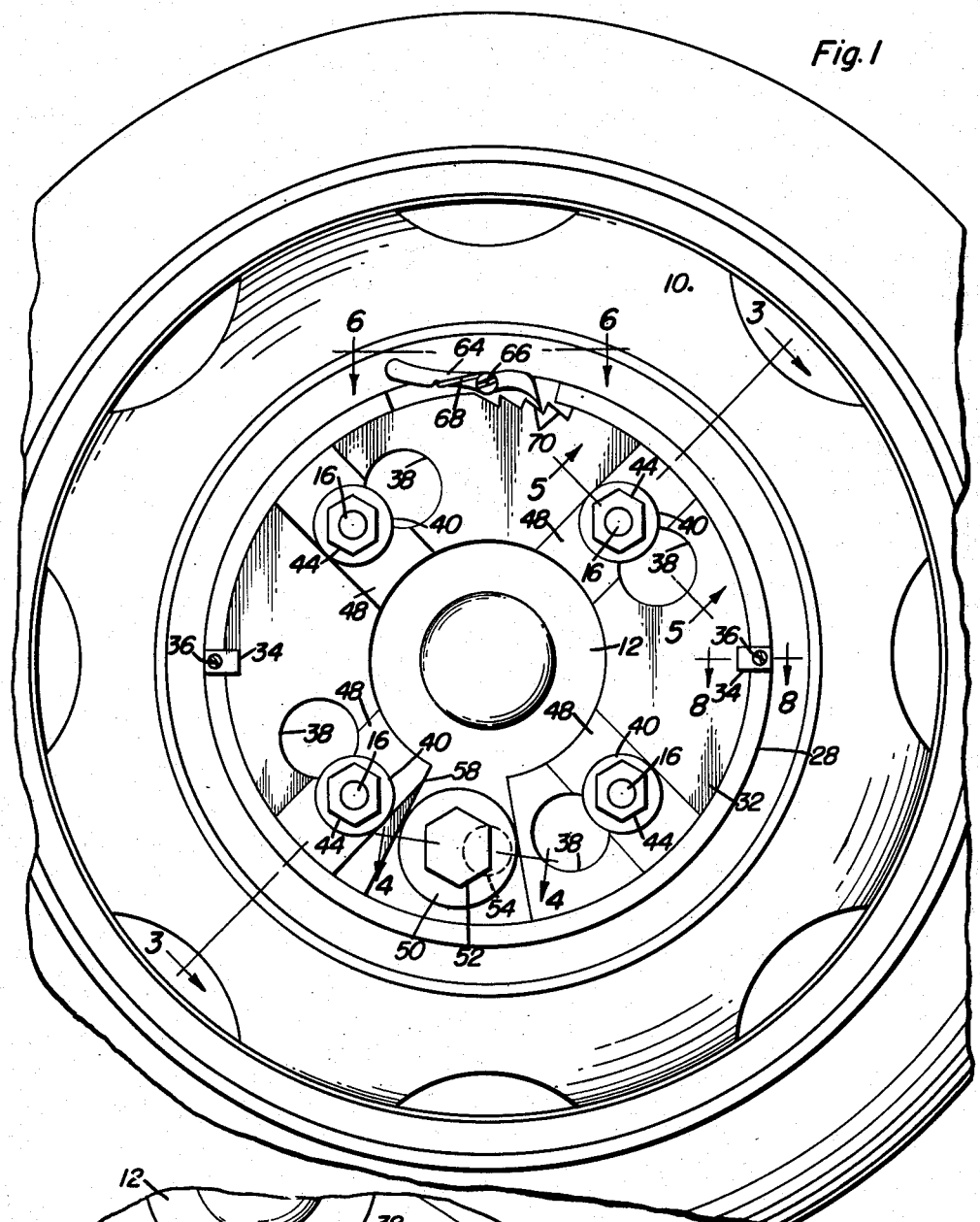
Figure 1 is a fragmentary elevational view of a vehicle wheel showing the invention in association therewith.
Figure 2:
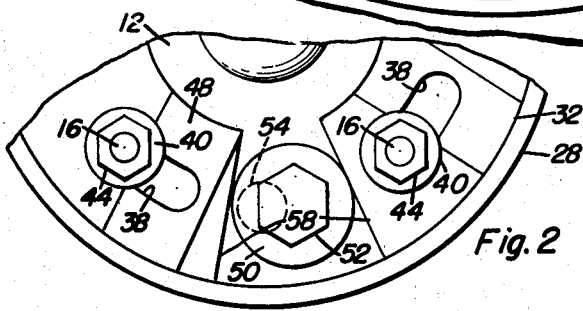
Figure 2 is a fragmentary elevational view, similar to that shown in Figure 1, but illustrating the invention in readiness for removal of the wheel.
Figure 3:
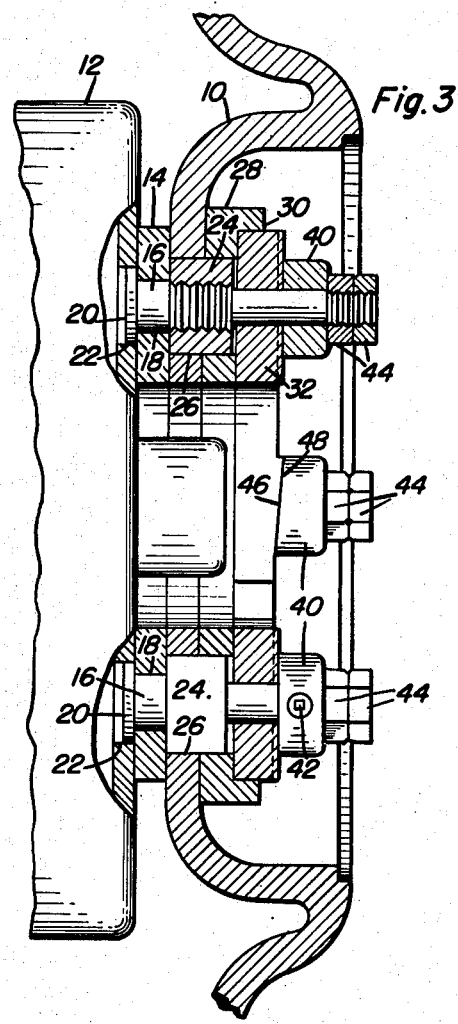
Figure 3 is a fragmentary sectional detail, taken substantially in the plane of the line 3—3 in Figure 1.

Referring now to the accompanying drawings in detail, the reference character 10 designates a vehicle wheel while the reference character 12 designates a brake drum or hub on which the wheel is mounted.

The drum or hub 12 is formed integrally with or has rigidly secured thereto an annular plate 14 which the wheel 10 abuts, while a plurality of wheel mounting studs 16 project outwardly from suitable apertures 18 with which the plate 14 is formed. The heads 20 of the studs are disposed in suitable recesses or bores 22 provided in the drum or hub 12, and cylindrical nuts 24 are screw threaded on the studs 16 against the plate 14 and are received in circular openings 26 formed in the wheel 10, so as to properly locate the wheel relative to the brake drum or hub.

The wheel unit includes an annular plate 28 which is rigidly secured to or is formed integrally with the wheel proper, the apertures or openings 26 extending through the plate 28 as well as through the wheel proper, so that the nuts 24 may be received therein.

Figure 8:
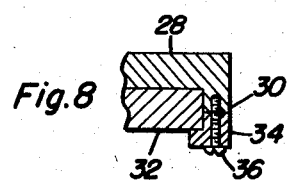
Figure 8 is a fragmentary sectional detail, taken substantially in the plane of the line 8—8 in Figure 1.

The plate 28 is provided at the marginal edge thereof with a flange 30 and a locking ring 32 is rotatably positioned within this flange, being sustained therein by a plurality of keeper elements or clips 34 which are mounted on the flange 30 by suitable screws 36 (see Figure 8).

Figure 7:
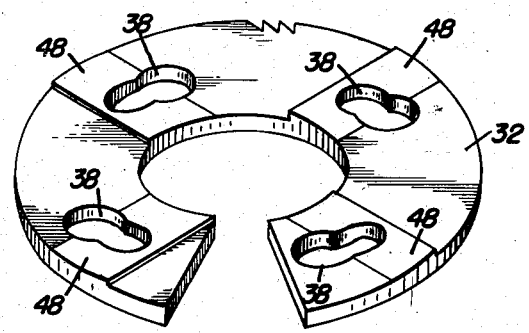
Figure 7 is a perspective view of the locking ring used in the invention.

The locking ring 32 is provided with a plurality of keyhole slots or openings 38 through which the studs 16 project outwardly, it being noted that the large end portions of the slots or openings are of a size that circular retaining members 40, mounted at the outer end portion of the studs 16, may pass through the slots when the wheel unit 10 is being installed or removed. The retaining members 40 are secured on the studs 16 by suitable set screws 42 and by pairs of lock nuts 44, and it is to be noted that the retaining members have bevelled inner surfaces 46 which are frictionally engageable with bevelled pads 48 provided on the outer surface of the locking ring 32 in the region of the respective slots 38, as is best shown in Figure 7.

It will be apparent from the foregoing that when the wheel unit, including the plate 28 and the ring 32, is applied to the hub 12 and plate 14, after passing the retaining members 40 through the relatively large end portions of the slots 38, rotation of the wheel unit in a clockwise direction will frictionally engage the bevelled surfaces 46 of the retaining members 40 with the bevelled pads 48, thus sustaining the wheel unit in position on the hub. Similarly, when the wheel unit is rotated in a counterclockwise direction, removal thereof will be facilitated.

This locking and unlocking and rotation of the wheel unit relative to the hub is effected by the provision of a cam 50, having a wrench receiving portion 52 and an eccentrically disposed, hollow and internally screw threaded fulcrum portion 54, the latter being rotatable in the plate 28, in which it is sustained by a suitable screw 56

Figure 4:
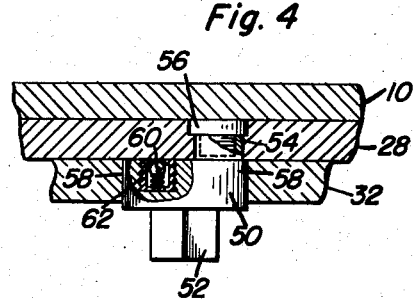
Figure 4 is a fragmentary sectional detail, taken substantially in the plane of the line 4—4 in Figure 1.
Figure 5:
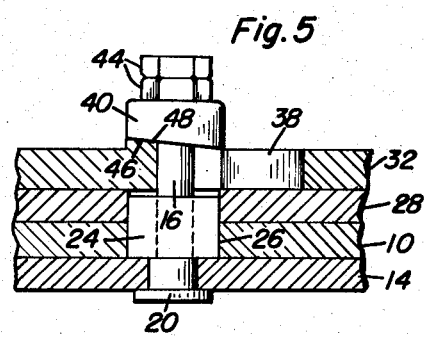
Figure 5 is a fragmentary sectional detail, taken substantially in the plane of the line 5—5 in Figure 1.
Figure 6:
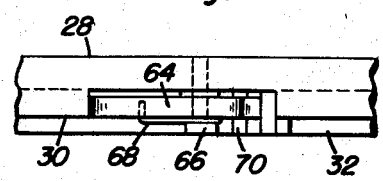
Figure 6 is a fragmentary detail taken substantially in the plane of the line 6—6 in Figure 1.

(see Figure 4). The cam 60 is disposed in a recess provided in the locking ring 32 and engages the edges 58 of this recess, so that by simply rotating the cam, the locking ring may be rotated relative to the plate 28 in one direction or the other.

A spring pressed element 60 is positioned in a suitable cup 62 with which the cam 50 is equipped and bears against the outer surface of the plate 28 so as to resist the rotation of the cam and, at the same time, to eliminate any possible vibration.

In addition to the foregoing, means are provided for preventing rotation of the locking ring 32 from its locked to its unlocked position, these means simply consisting of a pawl 64 which is suitably attached as at 66 to the plate 28 and is urged by a suitable spring 68 in engagement with a plurality of ratchet teeth 70 formed in the peripheral portion of the ring 32, so that by rotating the cam 50 the locking ring 32 may be rotated clockwisely to its locked position, but rotation thereof in an opposite direction, that is, to its unlocked position, can not be effected until the pawl 64 is manually disengaged from the teeth 70.

It may be noted that while the invention is primarily intended for use in mounting of vehicle wheels, it may be also employed for mounting other machine elements such as lathe chucks, etc.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a vehicle wheel mounting, the combination of a hub, outwardly projecting studs provided on said hub, wheel retaining members provided at the outer end portions of said studs and having bevelled inner surfaces, a wheel unit removably positioned on said hub and having apertures to receive said studs, a locking ring rotatably mounted on said wheel unit and having an outer surface provided with bevelled pads and with keyhole slots in said pads whereby to receive said retaining members and frictionally engage the bevelled inner surfaces of the latter with the bevelled pads by a rotational movement of said ring in a locking direction, said locking ring being provided with a recess, a rotatable locking cam mounted on said wheel unit and operatively engaging edges of said recess whereby said ring may be rotated relative to the wheel unit, the peripheral portion of said ring being provided with ratchet teeth, and a spring pressed pawl pivoted to said wheel unit and engaging said teeth to prevent rotation of said ring in an unlocking direction.

GEORGE EDWARD LAMBERT, Jr.

REFERENCES CITED

The following references are of record in the file of this patent:

UNITED STATES PATENTS

| Number | Name | Date |
|---|---|---|
| 1,995,097 | Fry | Mar. 19, 1935 |
| 2,031,114 | Lebel | Feb. 18, 1936 |
| 2,070,993 | McDonald | Feb. 16, 1937 |
| 2,237,702 | Harrison | Apr. 8, 1941 |
| 2,489,179 | Hartman | Nov. 22, 1949 |

FOREIGN PATENTS

| Number | Country | Date |
|---|---|---|
| 28,994 | Great Britain | 1909 |
| 242,769 | Switzerland | Nov. 16, 1946 |